United States Patent
Bankstahl

[19]

[11] Patent Number: 6,103,995

[45] Date of Patent: Aug. 15, 2000

[54] MOUNTING BRACKET FOR ENGINE-DRIVEN WELDER

[75] Inventor: Herbert A. Bankstahl, Appleton, Wis.

[73] Assignee: Illinois Tool Works Inc., Glenview, Ill.

[21] Appl. No.: 09/208,701

[22] Filed: Dec. 10, 1998

[51] Int. Cl.$^7$ .................................................. B23K 9/00
[52] U.S. Cl. ........................................ 219/133; 240/1 A
[58] Field of Search .................................. 219/133, 134; 290/1 R, 1 A

[56] References Cited

U.S. PATENT DOCUMENTS

| | | | |
|---|---|---|---|
| 1,380,123 | 5/1921 | Sullivan | 290/1 A |
| 1,492,800 | 5/1924 | Jaeger | 290/1 A |
| 1,723,851 | 8/1929 | Gumpper | 290/1 A |
| 1,947,713 | 2/1934 | Gumpper | 290/1 A |
| 2,086,036 | 7/1937 | Juergens | 290/1 A |
| 2,976,424 | 3/1961 | Anderson | 290/1 A |
| 5,620,620 | 4/1997 | Feldhausen et al. | 219/133 |
| 5,734,148 | 3/1998 | Latvis et al. | 219/133 |
| 5,965,949 | 10/1999 | Fukuda et al. | 290/1 A |

*Primary Examiner*—Clifford C. Shaw
*Attorney, Agent, or Firm*—Mark W. Croll; Thomas W. Buckman; John P. O'Brien

[57] ABSTRACT

Mounting brackets for an engine driven welding machine have respective first and second legs at right angles to each other. The mounting brackets can be attached to the welding machine base in a shipping mode or in a installation mode. When in the shipping mode, the second legs are under the machine base, and fasteners engage first sets of holes in the mounting bracket first legs to common sets of holes in the machine base. The welding machine can then be welded to a selected mounting surface by welding the mounting brackets and not the base. When in the installation mode, the mounting bracket second legs extend outwardly from the base, and fasteners engage second sets of holes in the mounting bracket first legs and the common set of holes in the base. Holes in the second legs of the mounting brackets are then exposed for installing it by fasteners to a mounting surface.

14 Claims, 1 Drawing Sheet

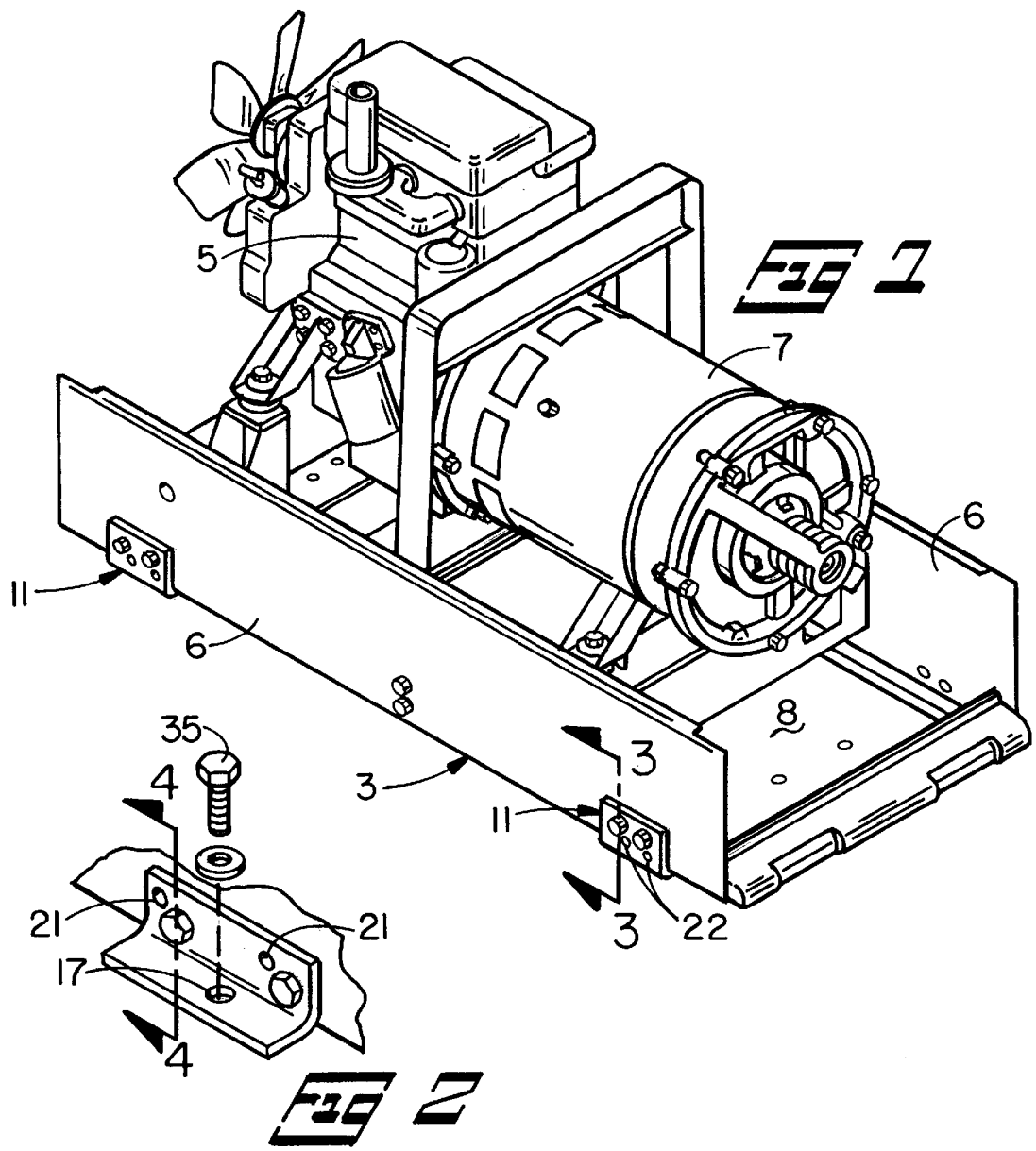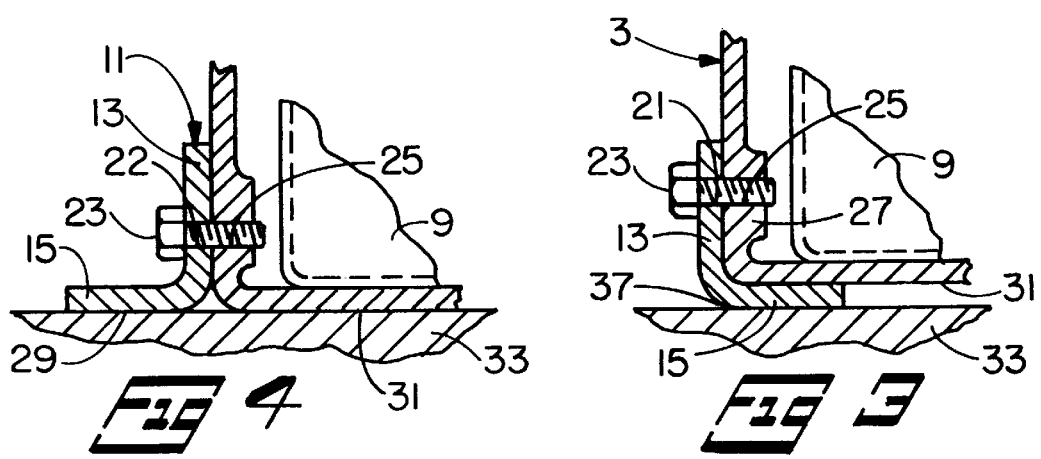

MOUNTING BRACKET FOR ENGINE-DRIVEN WELDER

BACKGROUND OF THE INVENTION

1. Field of the Invention

This invention pertains to welding machines, and more particularly to apparatus useful for shipping, handling, and installing engine driven welding machines.

2. Description of the Prior Art

Engine driven welding machines for overseas shipment are placed in protective cases. For efficient shipment in standard shipping containers, it is vitally important that the welding machines be no wider than 30 inches. To obtain as much welding capacity as possible within the 30 inches width limit, the welding machine bases are typically close to 30 inches wide. An example of a welding machine base that has minimum space requirements for both shipping and installation may be seen in U.S. Pat. No. 5,620,620.

On the other hand, since engine driven welding machines are large and heavy pieces of equipment, they require care both when transporting them and when installing them. It is therefore often desirable that the welding machine base include brackets. It is also desirable that these brackets be used to install the welding machine to a mounting surface. For example, the welding machine may be mounted by fasteners to the bed of a large truck or trailer. However, having brackets on the base that are accessible for handling and installing the welding machine presents the problem that the overall base width exceeds the maximum allowable shipping width.

In some situations, it is desirable that the welding machine base be welded to a metal frame at the work site. However, welding the base is a hazardous practice. Engine driven welding machines include a fuel tank, which is often made of a synthetic material, in the machine base. Welding on the base can cause the fuel tank to melt and cause a potentially dangerous situation.

Thus, a need exists for a way to both efficiently transport and versatilely install engine driven welding machines.

SUMMARY OF THE INVENTION

In accordance with the present invention, a universal mounting bracket is provided for an engine driven welding machine that enables the machine to be conveniently shipped, and installed. This is accomplished by fabricating the bracket to be interchangeable between a shipping mode and a installation mode.

The mounting bracket of the invention is generally L-shaped, having first and second legs. The first leg has two sets of holes through it. The second leg has a single hole. Typically, four mounting brackets are used on each welding machine, two on each side of the machine base.

The welding machine base has one or more common set of holes for each mounting bracket. The holes in the welding machine base are in the base side walls.

When the mounting brackets are in the shipping mode, their respective second legs extend inwardly under the machine base, and their first legs are in facing contact with a base side wall. Fasteners pass through the first set of mounting bracket holes and engage the common set of holes in the base, thereby attaching the brackets to the base. The bracket second legs are thus interposed between the machine base and the surface on which the machine rests. The overall width of the welding machine base is increased only by the thickness of the material of the first legs of the brackets. The mounting brackets thus do not defeat the goal of keeping the overall welding machine width to a minimum.

To place the mounting brackets in the installation mode, the fasteners are removed from the bracket first legs. The brackets are reversed such that their second legs extend outwardly from the welding machine base. The fasteners are used with the second sets of holes in the bracket first legs and with the associated common sets of holes in the machine base. The holes in the bracket second legs are then exposed and available for mounting the welding machine. The bracket second sets of holes and the common holes in the base are so located that the bottomsurfaces of the bracket second legs are coplanar with the bottomsurface of the base when the mounting brackets are in the installation mode. When the welding machine is placed on a desired mounting surface, screws or bolts can be used in conjunction with the holes in the second legs to install the welding machine to the surface.

In some instances, it may be desirable to weld the welding machine to the mounting surface. The mounting brackets of the invention are admirably suited to accommodate a welded installation. For a welded installation, the mounting brackets are preferably placed in the shipping mode. The mounting brackets provide satisfactory means for welding the machine to the mounting surface without welding on the machine base itself.

Other advantages, benefits, and features of the present invention will become apparent to those skilled in the art upon reading the detailed description of the invention.

BRIEF DESCRIPTION OF THE DRAWINGS

FIG. 1 is a perspective view of a portion of a typical engine driven welding machine showing a mounting bracket of the present invention in the shipping mode.

FIG. 2 is a partial view of the base of the welding machine of FIG. 1 showing the mounting bracket in the installation mode.

FIG. 3 is a cross sectional view on an enlarged scale taken along line 3—3 of FIG. 1.

FIG. 4 is a cross sectional view on an enlarged scale taken along line 4—4 of FIG. 2.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring to FIGS. 1 and 3, a typical engine driven welding machine 1 is illustrated that includes the present invention. The welding machine 1 comprises a base 3 having side walls 6 and a bottom wall 8. The base 3 supports an internal combustion engine 5. The engine 5 rotates a generator 7, which produces electrical power suitable for performing welding operations. The base also supports a fuel tank 9, which supplies the engine with fuel. The welding machine base is invariably fabricated of steel components, whereas the fuel tank 9 is usually molded from a synthetic material.

In accordance with the present invention, several mounting brackets 11 are incorporated into the welding machine 1. As shown, there are two mounting brackets 11 on each side wall 6 of the welding machine base 3. However, if desired, more than two mounting brackets can be used on each side of the base.

Each mounting bracket 11 has a first leg 13, and a second leg 15 at a right angle to the first leg. A length of approximately 1.50 inches for each leg 13 and 15 is satisfactory. The mounting bracket may be made of cold rolled steel approximately 0.25 inches thick.

In the first leg 13 of each mounting bracket 11 are two sets of holes. In the illustrated construction, the first set contains two holes 21, and the second set contains two holes 22. Also see FIG. 2. A diameter of approximately 0.44 inches for the holes 21 and 22 are satisfactory. There is a single hole 17 in the second leg 15. A diameter of approximately 0.63 inches is satisfactory for the hole 17.

In FIGS. 1 and 3, the mounting bracket 11 is shown in a shipping mode. In that situation, the second leg 15 of the mounting bracket is turned inwardly and lies under the welding machine base 3. Fasteners, which may be in the form of screws 23, pass through the first set of holes 21 in the mounting bracket first leg 13 and engage a common set of threaded holes 25 in the base side wall 6. The threaded holes 25 may be formed in a boss 27 in the base side wall. Alternately, the threaded holes 25 may be parts of nuts welded to the inside of the base side wall.

When the mounting brackets 11 are in the shipping mode, they add but a minimal amount to the overall width of the welding machine 1. Specifically, machine width is increased only to the extent of the thickness of the bracket material and the height of the heads of the screws 23. Accordingly, the welding machine can be packed in a case that meets the 30 inch width restriction for efficient space utilization of standard shipping containers.

FIGS. 2 and 4 show the mounting brackets in the installation mode. To place a mounting bracket in the handling mode, the screws 23 are removed from the base holes 25 and the mounting bracket first set of holes 21. The mounting brackets are reversed such that the second legs 15 extend outwardly from the welding machine base 3. Each mounting bracket is located such that the second set of holes 22 in the first leg 13 are aligned with the common set of holes 25 in the machine base. The screws 23 are inserted through the mounting bracket holes 22 and turned into the threaded holes 25 in the machine base. When the mounting brackets are in the installation mode, the bottomsurfaces 29 of the second legs are coplanar with the bottomsurface 31 of the machine base.

When the mounting brackets 11 are in the handling mode, the holes 17 in the second legs 15 are exposed. The holes 17 can then be used with fasteners 35 to install the welding machine to a mounting surface 33, such as a truck bed, trailer, or similar surface.

There may be applications for the engine driven welding machine 1 in which it is desirable to weld the machine to the mounting surface 33. However, it is dangerous to weld on the base 3, because such welding could melt the fuel tank 9. A safe but effective welding installation of the welding machine to the surface 33 is achieved by placing the mounting brackets 11 in the shipping mode, FIGS. 1 and 3. The mounting brackets are then welded to the mounting surface, as along line 37 at junction of the mounting bracket first leg 13 with the mounting surface. The machine may now be easily removed and re-installed by the use of fasteners 23. A further advantage of installing the welding machine using the mounting brackets in the shipping mode is that the base bottomsurface 31 is above the mounting surface. Because the base does not contact the mounting surface, abrasion on the base is eliminated. In addition, possible moisture and rust accumulation in the base is greatly reduced. Alternately, the welding machine 1 may be welded to the mounting surface 33 with the brackets 11 in the installation mode by welding the exposed edges 39, 41, and 43 to the mounting surface 33.

Thus, it is apparent that there has been provided, in accordance with the invention, a mounting bracket for engine driven welding machines that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. In a welding machine having a base with side walls that define at least one common set of holes and a bottom wall that has a bottomsurface:
   a. a plurality of mounting brackets each comprising a first leg having first and second sets of holes therethrough that are selectively alignable with the common set of holes in the machine base, and a second leg at approximately 90 degrees to the first leg, each mounting bracket being attachable to the base in a shipping mode whereat the second leg extends inwardly and is under the machine base and the mounting bracket first set of holes is aligned with the common set of holes in the machine base, and a installation mode whereat the second leg extends outwardly from the welding machine base and the mounting bracket second set of holes is aligned with the common set of holes in the welding machine base; and
   b. means for attaching the mounting bracket to the welding machine base in a selected one of the shipping mode or the installation mode by passing through the first or second set of holes, respectively, in the mounting bracket first leg and engaging the common set of holes in the welding machine base.

2. The welding machine of claim 1 wherein the second legs of the mounting brackets are interposed between the bottom wall of the welding machine base and a selected mounting surface when the mounting brackets are in the shipping mode to thereby eliminate abrasion on the base by the mounting surface and to reduce moisture and corrosion build-up in the welding machine base.

3. The welding machine of claim 1 wherein the welding machine can be welded to a selected mounting surface by welding the mounting brackets to the mounting surface and thereby avoiding welding the welding machine base to the mounting surface.

4. The welding machine of claim 1 wherein the second leg of each mounting bracket defines at least one hole therethrough that is exposed for lifting and moving the welding machine when the mounting bracket is in the handling mode.

5. The welding machine of claim 1 wherein the second leg of each mounting bracket has a bottomsurface that is coplanar with the welding machine base bottomsurface when the mounting bracket is in the installation mode.

6. Welding apparatus comprising:
   a. a base having a bottom wall and side walls upstanding from the bottom wall, each side wall being formed with at least one common set of holes;
   b. means supported by the base for producing electric welding power;
   c. at least one mounting bracket associated with each side wall of the base, each mounting bracket comprising a first leg in contact with a base side wall and a second leg at approximately a right angle to the first leg, the first leg defining first and second sets of holes therethrough; and d. fastener means for cooperating with the common set of holes in the base and with a selected one of the first or second sets of holes in the mounting bracket first leg to attach the mounting bracket to the base in a respective selected one of a shipping mode whereat the second leg of the mounting bracket is under the base and a installation mode whereat the second leg of the mounting bracket extends outwardly from the base.

7. The welding apparatus of claim 6 wherein the second leg of each mounting bracket has a hole therethrough that aids in installing the welding apparatus to a selected mounting surface when the mounting bracket is attached to the base in the installation mode.

8. The welding apparatus of claim 6 wherein the second leg of each mounting bracket has a bottomsurface, and the base has a bottomsurface, and wherein the bottomsurfaces of the mounting bracket second leg and of the base are in contact with a selected mounting surface when the mounting bracket is in the installation mode and the welding apparatus is placed on the mounting surface.

9. The welding apparatus of claim 6 wherein the second leg of the mounting bracket is interposed between the base and a selected mounting surface for the welding apparatus when the mounting bracket is attached to the base in the shipping mode.

10. A method of handling and installing a welding machine having a base with upstanding side walls comprising the steps of:

a. forming a plurality of common sets of holes in the base side walls;

b. providing a plurality of mounting brackets each having a first leg with first and second sets of holes therethrough, and a second leg at a right angle to the first leg;

c. placing the first legs of the mounting brackets against the welding machine side walls with the mounting bracket second legs facing inwardly and located under the base; and d. engaging fasteners between the first sets of holes in the mounting brackets and associated common sets of holes in the welding machine base and thereby attaching the mounting brackets to the base in a shipping mode.

11. The method of claim 10 comprising the further steps of:

a. placing the welding machine on a selected mounting surface; and b. welding the mounting brackets to the mounting surface and thereby installing the welding machine to the mounting surface without welding on the welding machine base.

12. The method of claim 10 comprising the further steps of:

a. disengaging the fasteners from the mounting brackets and the base;

b. placing the first legs of the mounting brackets against the welding machine base side walls with the mounting bracket second legs extending outwardly from the base; and c. re-engaging the fasteners between the second sets of holes in the mounting brackets and associated common sets of holes in the welding machine base side walls and thereby attaching the mounting brackets to the base in a installation mode.

13. The method of claim 12 wherein the step of placing the first legs of the mounting brackets against the welding machine base side walls comprises the step of locating respective bottomsurfaces of the second legs of the mounting brackets coplanar with a bottomsurface of the base.

14. The method of claim 12 comprising the further steps of:

a. placing the welding machine on a selected mounting surface; and b. engaging fasteners between the mounting bracket second legs and the mounting surface and thereby installing the welding machine to the mounting surface.

* * * * *